United States Patent
Bullard

(10) Patent No.: US 10,145,506 B2
(45) Date of Patent: Dec. 4, 2018

(54) LOCKABLE, PRECISION ADJUSTMENT SCREW, WITH OPERABILITY THROUGH A PRESSURE VESSEL WALL

(71) Applicant: Raytheon Company, Waltham, MA (US)

(72) Inventor: Andrew L. Bullard, Manhattan Beach, CA (US)

(73) Assignee: Raytheon Company, Waltham, MA (US)

(*) Notice: Subject to any disclaimer, the term of this patent is extended or adjusted under 35 U.S.C. 154(b) by 11 days.

(21) Appl. No.: 15/357,969

(22) Filed: Nov. 21, 2016

(65) Prior Publication Data

US 2018/0142830 A1 May 24, 2018

(51) Int. Cl.
| | |
|---|---|
| *F16M 11/32* | (2006.01) |
| *F16M 13/02* | (2006.01) |
| *F16M 11/04* | (2006.01) |
| *F16M 11/10* | (2006.01) |
| *F17C 13/08* | (2006.01) |

(Continued)

(52) U.S. Cl.
CPC .......... *F16M 13/02* (2013.01); *F16M 11/043* (2013.01); *F16M 11/10* (2013.01); *F17C 13/08* (2013.01); *G02B 7/003* (2013.01); *G02B 7/023* (2013.01); *G02B 7/1822* (2013.01); *F16M 2200/022* (2013.01); *F17C 2205/01* (2013.01);

(Continued)

(58) Field of Classification Search
CPC ...... F16M 13/02; F16M 11/10; F16M 11/043; F16M 2200/022; F17C 2221/033; F17C 2205/01; G02B 7/004

USPC .................. 248/371, 394–396, 398
See application file for complete search history.

(56) References Cited

U.S. PATENT DOCUMENTS

| 862,943 A | * 8/1907 | Swart |
| 3,268,750 A | 8/1966 | Gerber |

(Continued)

FOREIGN PATENT DOCUMENTS

| CN | 1766687 A | 5/2006 |
| CN | 202533636 U | 11/2012 |

(Continued)

OTHER PUBLICATIONS

Huntington Mechanical Labs; Compact Design Linear Devices in Pneumatic, Push-Pull & Hollow Tube, http://home.huntvac.com/?page_id=829; as accessed Nov. 21, 2016; 4 pages; Green Valley, California.

(Continued)

*Primary Examiner* — Gwendolyn W Baxter

(57) ABSTRACT

A precision adjustment screw mechanism comprises a platform carried by a base. The platform is selectively movable towards and away from the base, and is selectively tiltable with respect to the base. A push-pull screw is secured to and between the platform and the base, to selectively displace the platform towards and away from the base. The push-pull screw has a ball-and-socket type joint between the platform and the base, with the platform tiltable with respect to the base about the ball-and-socket type joint. A cylindrical bellows has a proximal end sealed to the base and a distal end sealed to the platform, and circumscribes the push-pull screw between the base and the platform. The bellows can react torque exerted on the platform by a fastener of the push-pull screw.

20 Claims, 4 Drawing Sheets

(51) Int. Cl.
  *G02B 7/00*  (2006.01)
  *G02B 7/02*  (2006.01)
  *G02B 7/182* (2006.01)
(52) U.S. Cl.
  CPC ........ *F17C 2221/033* (2013.01); *G02B 7/004* (2013.01)

(56) References Cited

U.S. PATENT DOCUMENTS

| | | | |
|---|---|---|---|
| 3,897,139 A | | 7/1975 | Caruolo et al. |
| 4,585,197 A | * | 4/1986 | Liautaud ................ F16M 11/14 248/309.4 |
| 4,988,065 A | * | 1/1991 | Leban ................... B60R 13/005 248/181.1 |
| 5,431,406 A | * | 7/1995 | Ishii ................... A63B 69/3652 248/396 |
| 2005/0133481 A1 | | 6/2005 | Takahashi et al. |
| 2010/0067979 A1 | | 3/2010 | Fayollas et al. |
| 2012/0168593 A1 | * | 7/2012 | Mekid ................... F16M 11/043 248/398 |

FOREIGN PATENT DOCUMENTS

| | | |
|---|---|---|
| JP | H10-153726 A | 6/1998 |
| WO | WO 2016/057173 A1 | 4/2016 |

OTHER PUBLICATIONS

Huntington Mechanical Labs; Linear Motion Devices; http://home.huntvac.com/?page_id=806; as accessed Nov. 21, 2016; 2 pages; Grass Valley, California.

Huntington Mechanical Labs ; Rotary Motion Feedthroughs; http://home.huntvac.com/?page_id=804; as accessed; Nov. 21, 2016; 4 pages; Grass Valley, California.

Inficon; Linear Motion Feedthroughs CF; http://products.inficon.com/en-us/Product/Detail/Linear-Motion-Feedthroughs-CF?path=Products%2FVacuum%20Feedthroughs; as accessed Nov. 21, 2016; 3 pages; Bad Ragaz, Switzerland.

MDC Vacuum Products, LLC; Linear Motion Feedthroughs; http://www.mdcvacuum.com/DisplayProductContent.aspx?d=MDC&p=m.7.1.2.c&g=m712; as accessed Nov. 21, 2016; 2 pages; Hayward, California.

MDC Vacuum Products, LLC; Rotary Motion Feedthroughs; http://www.mdcvacuum.com/displayproductcontent.aspx?d=MDC&p=m.7.1.1.1; as accessed Nov. 21, 2016; 3 pages; Hayward, California.

Kroes et al., Opto-mechanical design for transmission optics in cryogenic IR instrumentation, Advanced Optical and Mechanical Technologies in Telescopes and Instrumentation, Jul. 23, 2008, vol. 7018, SPIE Proceedings, France.

* cited by examiner

LOCKABLE, PRECISION ADJUSTMENT SCREW, WITH OPERABILITY THROUGH A PRESSURE VESSEL WALL

GOVERNMENT LICENSE RIGHTS

This invention was made with government support under a withheld contract. The government has certain rights in the invention.

BACKGROUND

Infrared focal plane detector arrays can be mounted inside vacuum housings which allow the air to be evacuated and the detector array cooled down for testing. Making focus adjustments of the focal plane array (FPA) during testing requires either moving the entire vacuum housing or moving the detector inside the housing. Adjusting the focus or position of an entire vacuum housing or dewar containing the FPA can require movement of the vacuum port interface, external cables, etc., which often is not a feasible option. In cases where the vacuum housing cannot be moved, adjustment of the FPA while the vacuum housing is sealed and the FPA is cooled is difficult and time consuming. Many iterations of optical alignment adjustment while the sensor is being held under a vacuum may be required at great expense in cost and schedule. Sensor alignment can require multiple iterations in which the initial alignment is made, the sensor placed under vacuum, alignment shift assessed, the vacuum removed, calculated bias to the alignment is applied, the vacuum reapplied, and alignment rechecked under vacuum. Another approach has been to use vacuum feedthrough tools to adjust cold push-pull screws supporting the FPA, but this results in a momentary thermal short to the FPA requiring some time to thermally re-stabilize, and some vacuum loss as the feedthrough tools are being operated. Linear motion vacuum feedthrough micrometers can provide linear or rotational motion, but not tilting adjustment.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
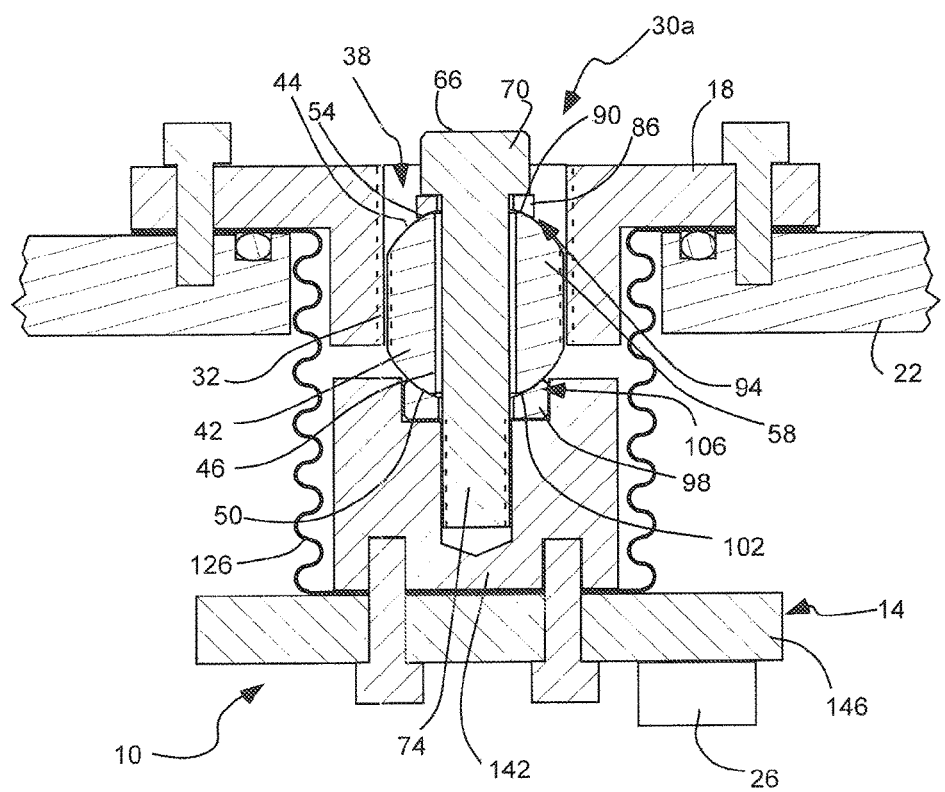
FIG. 1 is a cross-sectional side view of a lockable precision adjustment screw mechanism in accordance with an example of the present disclosure, shown carrying an optical element and carried by a pressure vessel.

Reference will now be made to the examples illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

In one example, disclosed is a precision adjustment screw mechanism comprising a platform carried by a base. The platform is selectively movable towards and away from the base, and is selectively tiltable (able to tilt or be tilted) with respect to the base. A push-pull screw is positioned between and secured to both the platform and the base, to selectively displace the platform towards and away from the base. The push-pull screw has a ball-and-socket type joint between the platform and the base, with the platform tiltable with respect to the base about the ball-and-socket type joint. A cylindrical bellows has a proximal end sealed to the base and a distal end sealed to the platform, and circumscribes the push-pull screw between the base and the platform.

In accordance with a more detailed aspect, the cylindrical bellows can be formed of a rigid material to provide rigidity in a torsional direction, and to resist rotational movement of the platform with respect to the base about a longitudinal axis of the cylindrical bellows. The cylindrical bellows can be corrugated along the longitudinal axis to provide flexibility along the longitudinal axis, and to allow tilting movement of the platform with respect to the base.

In accordance with a more detailed aspect, the base can be fixed to a pressure vessel, such that the platform and the cylindrical bellows are disposed in the pressure vessel. The pressure vessel can be a temperature controlled, cryogenic vacuum chamber capable of maintaining a vacuum and an internal temperature below 123 K. An optical element may be coupled to the platform. The optical element can be selected from the group consisting of an FPA, a lens, a mirror, a laser, a light source, an imaging element, or combinations thereof.

Also disclosed is a lockable, precision adjustment screw mechanism comprising a platform carried by a base. An adjuster screw is carried by the base, and is rotatable to retract and advance with respect to the base to displace the platform towards and away from the base, respectively. A fastener extends through a bore in the adjuster screw to the platform. The bore of the adjuster screw is wider than the fastener with the fastener tiltable in the bore. A cylindrical bellows has a proximal end sealed to the base and a distal end sealed to the platform, and circumscribes the adjuster screw and the fastener between the base and the platform.

In accordance with a more detailed aspect, a ball-and-socket type joint can be positioned between the platform and the adjuster screw, such that the platform tiltable with respect to the base about the ball-and-socket type joint.

The present disclosure also sets forth a lockable precision adjustment screw mechanism for precision positioning through a pressure vessel wall. One example provides the ability to adjust a position of an element, such as focusing a focal plane array (FPA), and lock down the adjustment while the element or FPA is being tested at cryogenic temperature and in vacuum conditions inside a vacuum chamber or housing without moving the vacuum housing, without removing the element or FPA from cryogenic temperature or the vacuum, and without causing a thermal short to the element or the FPA. Thus, provided or facilitated is the ability to adjust and lock the position of cryo-cooled detectors or optics while they are operating at cryogenic temperature. In addition, real-time feedback can be provided or obtained, e.g. while making focus adjustments the focus quality can be observed.

The lockable precision adjustment screw mechanism incorporates a vacuum bellows with a lockable push-pull screw in such a way that a platform inside the vacuum chamber can be adjusted without any sliding contact at seals. In addition, the load path along the push-pull screw remains the same. The vacuum bellows is added to an outside bushing surrounding the adjuster screw that connects to a sealed plate, which engages the locking screw at a tip of the push-pull screw. The opposite side of the plate functions as a moving platform inside the pressure vessel or vacuum housing. Two or three mechanisms can be used to support an FPA via thermal isolators, thus providing focus and tip-tilt adjustment, and locking capability from outside the vacuum housing. The vacuum bellows can be a titanium welded bellows with extension and tip-tilt compliance, but also with significant torsional rigidity to react the torque of a locking screw. The push-pull screw design integrated with a vacuum bellows both allows operability through a chamber wall, such as a vacuum chamber, and reacts to the applied torque on the locking screw. The bellows not only provides a vacuum and contamination seal, but also reacts to the locking torque. Thus, the locking torque can be reacted directly to the vacuum wall through the bellows to resist undesired movement of the element being adjusted. The position of the element being adjusted can be critical, and possibly sensitive to applied torques. In addition, the push-pull screw design integrated with the vacuum bellows allows adjustment of the position of the element within the pressure vessel from outside the pressure vessel. Thus, with the lockable precision adjustment screw mechanism disclosed herein, the push-pull screw is accessible outside the pressure vessel. As a result, special tooling that must pass through a vacuum dewar wall of prior systems or mechanisms is not required, and thus thermal shorts to the cold hardware that occur in prior systems or mechanisms are eliminated. Furthermore, the vacuum housing can remain in place, which allows the vacuum port STE and all other external connections, including cabling, to be unperturbed.

The mechanism also provides the ability to lock the adjustment, or position of the platform relative to the base. The mechanism achieves excellent dimensional stability when exposed to mechanical or thermal environmental loads.

The lockable precision adjustment screw mechanism fastens a movable platform to a fixed base using one or more (and in one aspect two or three) adjustments, each of which can extend or retract the movable platform with respect to the base, and thus can tilt the platform with respect to the base. Each adjustment has an adjuster screw that can be rotated with a spanner wrench, and locked with a single concentric locking screw, that both clamps the platform and the base together, and locks the position of the adjuster screw.

Referring to FIG. 1, a lockable precision adjustment screw mechanism 10 is shown in an exemplary embodiment of the present invention. Specifically, FIG. 1 is a cross-sectional side view of the lockable precision adjustment screw mechanism 10 shown carrying an optical element 26 and carried by a pressure vessel 22. The lockable precision adjustment screw mechanism 10 comprises a movable platform 14 and a fixed base 18 that carries the movable platform 14. The platform 14 is selectively moveable with respect to the base 18, such as displaceable towards and away from the base 18. In addition, the platform 14 is selectively tiltable with respect to the base 18. Furthermore, the platform 14 is lockable with respect to the base 18. The platform 14 and base 18 can be plates formed of metal, such as by machining or being cut from stock. The base 18 can be formed or shaped as a flange.

In one aspect, the base 18 can be fixed to the pressure vessel 22. The base 18 can cover an opening in the pressure vessel 22, and can be sealed with respect to the pressure vessel 22, such as with an o-ring seal. The platform 14 can be disposed inside the pressure vessel 22, with the position of the platform 14 maintained by the base 18, or the lockable precision adjustment screw mechanism 10. In one aspect, the pressure vessel 22 can be a vacuum chamber or housing. In another aspect, the pressure vessel 22 can be a cryogenic dewar. In another aspect, the pressure vessel 22 can be a temperature controlled, cryogenic vacuum chamber. Other types of pressure vessels are further contemplated and will be apparent to those skilled in the art. The temperature controlled, cryogenic vacuum chamber can be capable of maintaining a vacuum. In one aspect, the vacuum can be less than atmospheric pressure. In another aspect, the vacuum can be substantially void of all gas. In addition, the temperature controlled, cryogenic vacuum chamber can be capable of maintaining a cryogenic temperature. In one aspect, the chamber can have an internal temperature below 123 K. In another aspect, the chamber can have an internal temperature below 100 K.

In another aspect, the base 18 can be fixed to a vehicle. The vehicle can be a wheeled motorized vehicle, such as a jeep, a Humvee, a truck, etc. The vehicle can be an aircraft, such as a plane, a helicopter, a drone, a dirigible, etc. The vehicle can be a rocket, a satellite, etc. The vehicle can be a watercraft, such as a ship, a boat, a submarine, etc. In one aspect, the base or the vehicle can be a military vehicle. In another aspect, the base or the vehicle can be a film vehicle.

Indeed, those skilled in the art will recognize that the vehicle can be any type of vehicle for use in any desired application.

The platform 14 can carry the optical element 26 by coupling the optical element 26 to the platform 14. The optical element 26 can be a lens, a mirror, a laser, a light source, an imaging element, or others, or combinations thereof. The imaging element can be a focal plane array (FPA). Thus, the lockable precision adjustment screw mechanism 10 can be utilized for precision positioning of the optical element 26 with respect to or within the pressure vessel 22.

Figure 4A:
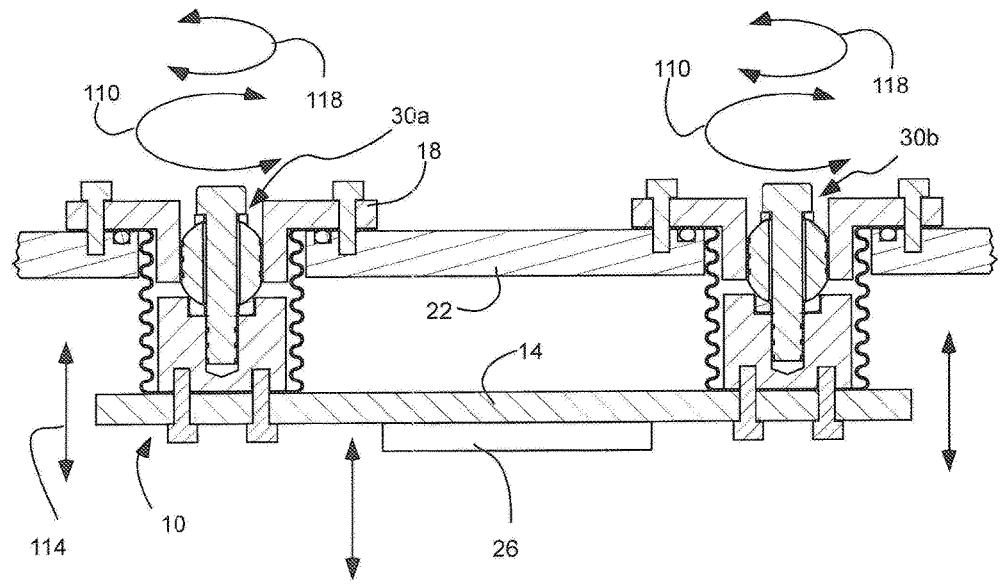
FIG. 4a is a cross-sectional side view of the lockable precision adjustment screw mechanism of FIG. 1, and showing precision adjustment of a platform with respect to a base, and namely displacing the platform towards and away from the base.
Figure 4B:
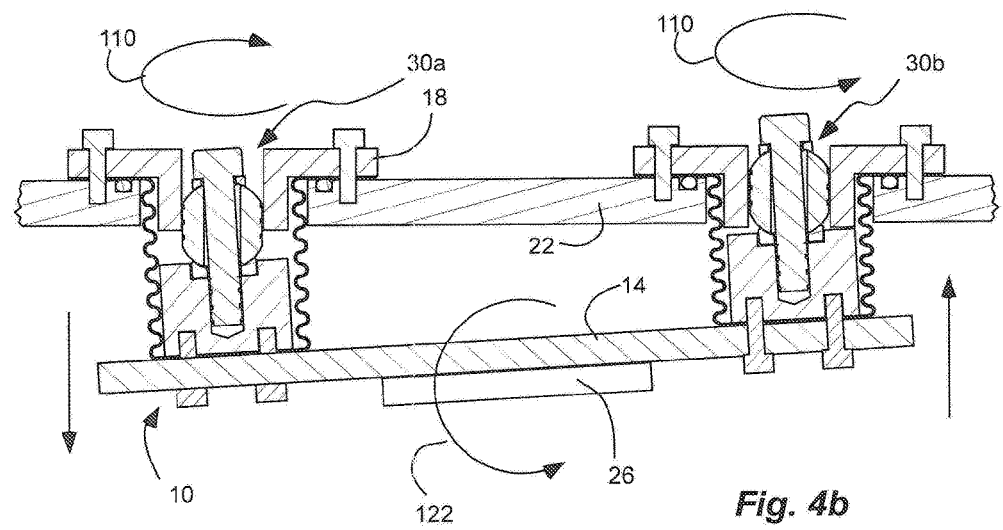
FIG. 4b is a cross-sectional side view of the lockable precision adjustment screw mechanism of FIG. 1, and showing precision adjustment of a platform with respect to a base, and namely tilting the platform with respect to the base.

As shown in FIGS. 4*a* and 4*b*, the lockable precision adjustment screw mechanism 10 can have multiple spaced-apart adjustments 30*a* and 30*b* disposed between the base 18 and the platform 14, such as a set of two, as shown, or three. A first adjustment 30*a* will be described herein with the understanding that the other is the same. Those of skill in the art will appreciate that three adjustments can be used to obtain additional tilting, or tilting about another axis. Referring again to FIG. 1, the base 18, and the adjustment 30*a*, has a threaded bore 32 disposed therein and threaded with internal screw threads to enable coupling the adjustment 30*a* to the base 18.

A push-pull screw 38 is secured to and between the platform 14 and the base 18 to selectively displace the platform 14 towards and away from the base 18. In addition, the push-pull screw 38 is carried by the base 18, and is movably disposed in the threaded bore 32. The push-pull screw 38 has external screw threads that engage the internal screw threads of the threaded bore 32, such that rotating the push-pull screw 38 advances and retracts the push-pull screw 38 in the threaded bore 32 and with respect to the threaded bore 32, and thus displaces the platform 14 away from and towards the base 18, respectively. Furthermore, the push-pull screw 38 has a fastener 66 that can tilt in a bore 46 extending through the push-pull screw 38, and has one or more ball-and-socket type joints 94 and 106 between the platform 14 and the base 18, to allow the platform 14 to tilt with respect to the base 18 about the ball-and-socket type joints 94 and 106, as discussed in greater detail below. The fastener 66 also locks the ball and socket type joints 94 and 106, locks tilting of the platform 14 with respect to the push-pull screw 38 and thus the base 18, and locks movement of the push-pull screw 38 in the threaded bore 32, and thus movement of the platform 14 with respect to the base 18, as discussed in greater detail below.

Figures 2, 3:
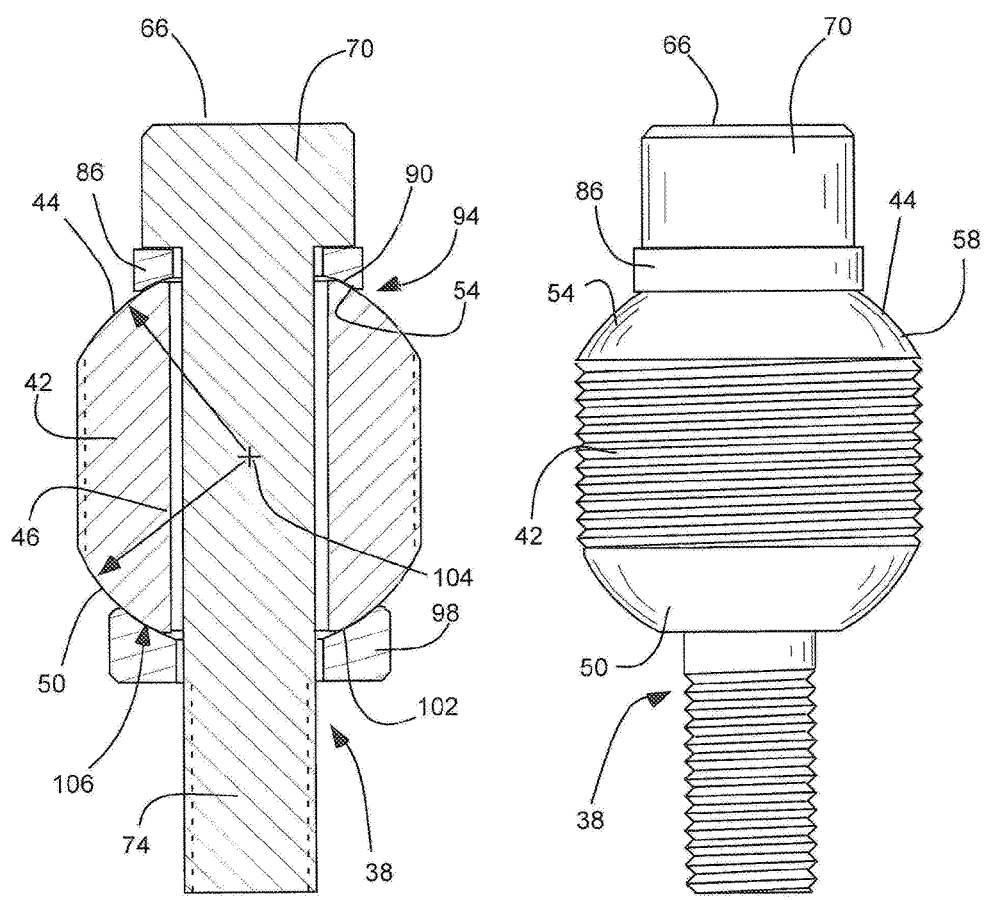
FIG. 2 is a cross-sectional side view of a push-pull screw of the lockable precision adjustment screw mechanism of FIG. 1.
FIG. 3 is a side view of the push-pull screw of the lockable precision adjustment screw mechanism of FIG. 1.

Referring to FIGS. 1, 2 and 3, details of the push-pull screw 38 are described. Specifically, FIG. 2 is a cross-sectional side view of the push-pull screw 38, and FIG. 3 is a side view of the push-pull screw 38. The push-pull screw 38 provides fine adjustment while also providing reliable locking capable of withstanding high acceleration loads. In addition, the push-pull screw 38 has a locking feature that does not distort surrounding structure or alter alignment. Furthermore, the push-pull screw 38 has a compact size, light weight, and material that can be compatible with space environments.

The push-pull screw 38 comprises an adjuster screw 42 displaceable in the base 18, or the threaded bore 32 thereof. The adjuster screw 42 has external screw threads or a threaded perimeter that engages the internal screw threads of the threaded bore 32, such that rotating the adjuster screw 42 advances and retracts the push-pull screw 38 in the threaded bore 32 and with respect to the threaded bore 32, and thus displaces the platform 14 away from and towards the base 18, respectively. The adjuster screw 42 has a proximal end accessible by a tool defining a head 44, and an opposite distal end engaging the platform 14. The adjuster screw 42 has a bore 46 extending longitudinally therethrough. The distal end of the adjuster screw 42 has a truncated convex end 50 or a rounded distal end facing the platform 14. In addition, the adjuster screw 42 has an opposite truncated convex end 54 or a rounded proximal end facing away from the platform 14. In addition, the head 44 or proximal end of the adjuster screw 42 can have notches arrayed around the head 44 and circumscribing the bore 46. Thus, a special tool can have tabs corresponding to the notches to engage and selectively turn the adjuster screw 42, and selectively displace the platform 14 with respect to the base 18. The adjuster screw 42 can be formed of suitable material(s) (e.g., metal), and can be formed by machining or other known methods.

The push-pull screw 38 also comprises a fastener 66 extending through the bore 46 in the adjuster screw 42. The fastener 66 has a proximal end with a head 70 and a distal end coupled to the platform 14, such as by screw threads. The fastener 66, or a shank thereof 74, can have a smaller diameter or width than a larger diameter or width of the bore 46 of adjuster screw 42. The bore 46 of the adjuster screw 42 is wider than the fastener 66, or shank 74 thereof. Thus, the fastener 66 can tilt in the bore 46. In one aspect, the fastener 66 can be a socket head cap screw with external screw threads. The platform 14 can have internal screw threads. The external screw threads of the fastener 66 can engage the internal screw threads of the platform 14. Thus, the fastener 66 secures the platform 14 to the adjuster screw 42, and thus to the base 18.

In addition, the push-pull screw 38 can have multiple washers or the like disposed on either side of the adjuster screw 42, and between the head 70 of the fastener 66 and the head 44 of the adjuster screw 42, and between the distal end of the adjuster screw 42 and the platform 14. In one aspect, the washers can be separate and discrete from the fastener 66 and the adjuster screw 42. In another aspect, the surfaces or shapes of the washers can be incorporated by or formed in the fastener 66 and the adjuster screw 42. The washers can be formed of a suitable material or materials, (e.g., metal), and can be formed by machining or stamping or other methods as known.

A proximal washer 86 can be disposed on the fastener 66 and between the head 70 of the fastener and the adjuster screw 42. The proximal washer 86 has a concave indentation 90 receiving and abutting the truncated convex end 54 of the adjuster screw 42. Thus, the proximal washer 86 can be sandwiched between the head 70 of the fastener 66 and the head 44 of the adjuster screw 42. The concave indentation 90 of the proximal washer 86 and the truncated convex end 54 of the adjuster screw 54 can define a proximal ball-and-socket joint 94. As the fastener 66, or shank 74 thereof, tilts in the bore 46 of the adjuster screw 42, the head 70 of the fastener 66 can tilt with respect to the head 44 of the adjuster screw 42 about the proximal ball-and-socket joint 94, with the truncated convex end 54 of the adjuster screw 42 pivoting in the concave indentation 90 of the proximal washer 86. In another aspect, the concave indentation 90 can be associated with or carried by the head of the fastener, such as by being formed in the fastener.

Similarly, a distal washer 98 can be carried by the platform 14 and located at a distal end of the fastener 66. Thus, the distal washer 98 can be positioned between the adjuster screw 42, or distal rounded end thereof, and the platform 14. The distal washer 98 has a concave indentation 102 receiving and abutting the truncated convex end 50 of the adjuster screw 42. The concave indentation 102 of the distal washer 98 and the truncated convex end 50 of the adjuster screw 42 can define a distal ball-and-socket joint 106. As the fastener 66, or shank 74 thereof, tilts in the bore 46 of the adjuster screw 42, the platform 14 and the distal washer 98 can tilt with respect to the base 14 and the adjuster screw 42 about the distal ball-and-socket joint 106, with the truncated convex end 50 of the adjuster screw 42 pivoting in the concave indentation 102 of the distal washer 98. Thus, the ball-and-socket type joint 106 of the push-pull screw 38 can comprise the rounded distal end or truncated convex end 50 of the adjuster screw 42 abutting to the concave indentation 102 carried by the platform 14. The ball-and-socket type joint 106 can be disposed between the adjuster screw 42 and the platform 14. In another aspect, the concave indentation 102 can be associated with or carried by the platform 14, such as by being formed in the platform 14.

In one aspect, the ball-and-socket joint can be two ball-and-socket joints, the proximal and distal ball-and-socket joints 94 and 106, separated from one another and on opposite ends of the adjuster screw 42, and opposite ends of the push-pull screw 38. In one aspect, the proximal and distal ball-and-socket joints 94 and 106 have the same rotational center 104.

The fastener 66 extends through the proximal washer 86, the bore 46 of the adjuster screw 42, and the distal washer 98, and is coupled to the platform 14. Thus, the proximal washer 86, the adjuster screw 42, and the distal washer 98 are disposed between, and retained between, the head 70 of the fastener 66 and the platform 14. The fastener 66 secures the platform 14 to the adjuster screw 42, and thus the base 18. In addition, the fastener 66 is capable of applying an axial load (along the axis of the fastener 66) on the ball-and-socket type joint 94 and/or 106. The axial load on the ball-and-socket type joint 94 and/or 106 locks an orientation of the fastener 66 in the adjuster screw 42, and thus locks a relative orientation of the platform 14 with respect to the base 18.

As described above, the push-pull screw 38 can have a ball-and-socket type joint 94 and/or 106 to allow the platform 14 to tilt with respect to the base 18. And the fastener 66 can tilt in the bore 46 of the adjuster screw 42 to allow the platform 14 to tilt with respect to the base 18. The ball-and-socket type joint can comprise the proximal and distal ball-and-socket type joints 94 and 106 operatively disposed between the platform 14 and the base 18, and with the platform 14 tiltable with respect to the base 18 about the ball-and-socket type joints 94 and 106. In one aspect, the push-pull screw 38 can comprise the proximal ball-and-socket type joint 94 between the head 70 of the fastener 66 and the head of the adjuster screw 42, and the distal ball-and-socket type joint 106 between the distal end of the adjuster screw 42 and the platform 14. The proximal and distal ball-and-socket type joints 94 and 106 comprise convex surfaces 54 and 50 at proximal and distal ends of the adjuster screw 42, and the proximal concave indentation 90 associated with the head 70 of the fastener 66, and the distal concave indentation 102 associated with the platform 14. The proximal and distal ball-and-socket type joints 94 and 106 have the same rotational center 104 or center of curvature so that they pivot about the same point. Thus, the platform 14 is tiltable with respect to the adjuster screw 42 about the ball-and-socket type joint 94 and/or 106, and the fastener 66 is tiltable within the bore 46 in the adjuster screw 42.

Referring to FIG. 4a, operation of the lockable precision adjustment screw mechanism 10, the adjustments 30a and 30b, and the push-pull screws 38 is shown to displace the platform 14 with respect to the base 18. FIG. 4a is a cross-sectional side view of the lockable precision adjustment screw mechanism 10 showing precision adjustment of platform 14 with respect to the base 18, and namely linearly displacing the platform 14 towards and away from the base 18. The adjuster screw 42 is rotatable 110 to advance and retract the adjuster screw 42 in the threaded bore 32 of the base 18, and thus displace 114 the platform 14 (and optical element 26) with respect to the base 18, both away from and towards, respectively. In addition, a pair of adjustments 30a and 30b are shown which can linearly displace the platform 14 and optical element 26 thereon with respect to the base 18. The fastener 66 can be rotatable 118 to tighten and loosen the proximal and distal ball-and-socket joints 94 and 106 to tighten and loosen pivotal movement of the platform 14 with respect to the base 18. Thus, as the fastener 66 is tightened the platform 14 (or distal washer 98) is locked into position against the adjuster screw 42, or the truncated convex end 50 thereof.

Referring to FIG. 4b, operation of the lockable precision adjustment screw mechanism 10, the adjustments 30a and 30b, and the push-pull screws 38 is shown to displace the platform 14 with respect to the base 18. FIG. 4b is a cross-sectional side view of the lockable precision adjustment screw mechanism 10 showing precision adjustment of the platform 14 with respect to the base 18, and namely tilting the platform 14 with respect to the base 18. The pair of adjustments 30a and 30b are shown which can be rotated 110 in opposite directions (to advance one adjustment 30a and retract the other adjustment 30b) to tilt or rotate 122 the platform 14, and optical element 26 thereon, with respect to the base 18. Those skilled in the art will recognize that a set of three adjustment can be used to obtain tilting about another axis transverse to the first, or two or multiple degrees of tilting.

In one aspect, the head 44 of the adjuster screw 42 can have notches therein, and located outside a perimeter of a head 70 of the fastener 66. The notches can be arrayed around the head 44 of the adjuster screw 42 or the fastener 66. Thus, a special tool can have tabs corresponding to the notches to engage and selectively turn the adjuster screw 42, and selectively displace the platform 14 with respect to the base 18 as the adjuster screw 42 advances or retracts. In addition, the fastener 66 can be turned by a tool, which can extend through the special tool, to tighten the fastener 66, and lock the position of the adjuster screw 42, and thus lock the orientation of the platform 14 with respect to the base 18.

As described above, three adjustments can be utilized to obtain rotation or tilt of the platform 14 with respect to the base 18, as well as displacement of the platform 14 with respect to the base 18. All three adjustments can be accessible from an exterior of the base 18 and the pressure vessel 22. Thus, all adjustments and locking are achieved with tools approaching from the same direction for ease of access, and from outside the pressure vessel 22.

Figure 5:
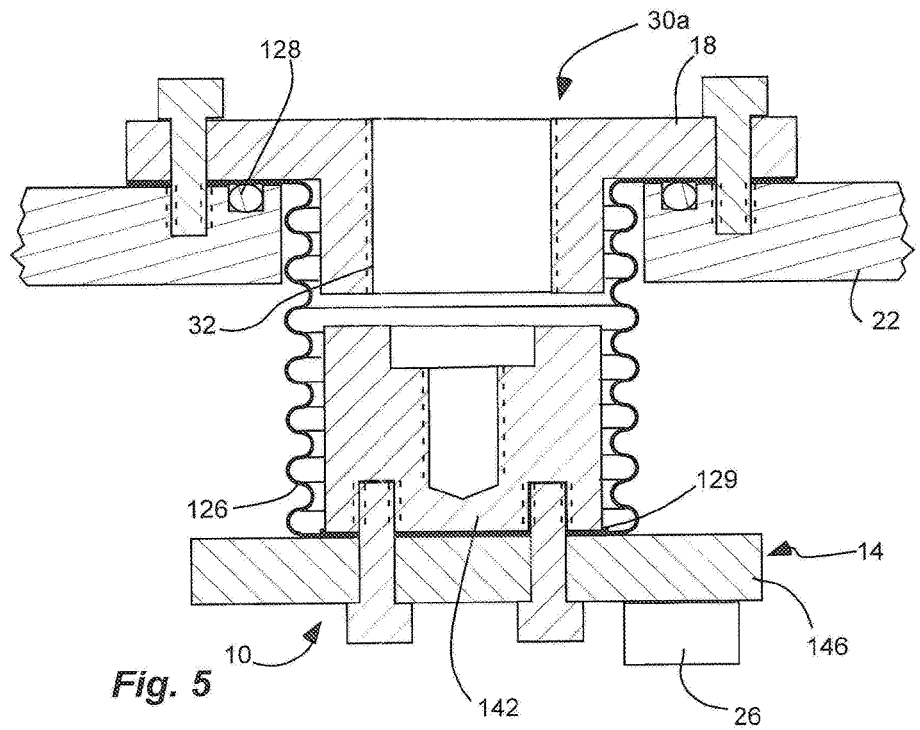
FIG. 5 a cross-sectional side view of the lockable precision adjustment screw mechanism of FIG. 1, shown with a push-pull screw removed.
Figure 6:
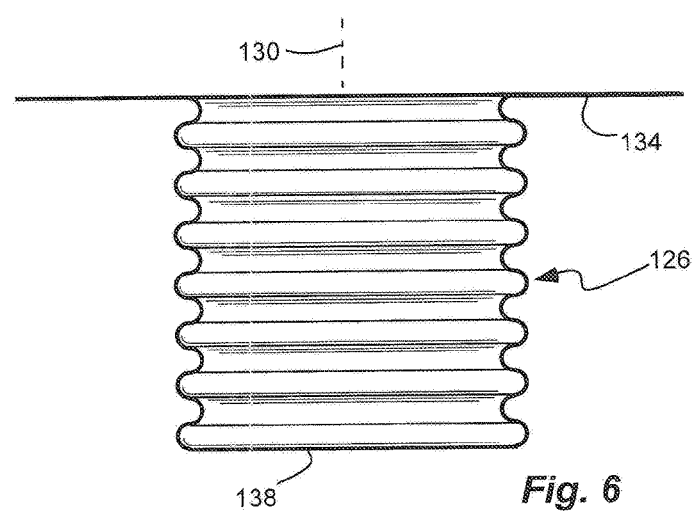
FIG. 6 is a side view of a bellows of the lockable lateral adjuster mechanism of FIG. 1.

Referring to FIGS. 5 and 6, the lockable precision adjustment screw mechanism 10, the adjustment 30a, is shown without the push-pull screws 38. Specifically, FIG. 5 is a cross-sectional side view of the lockable precision adjustment screw mechanism 10 shown with the push-pull screw 38 removed, and FIG. 6 is a side view of a bellows 126 of the lockable lateral adjuster mechanism 10. The lockable precision adjustment screw mechanism 10 and/or the adjustment 30a has a cylindrical bellows 126 with proximal and distal ends (bellows 126 also shown in FIG. 1). The proximal end of the bellows 126 is sealed to the base 18, such as with an o-ring 128, and the distal end is sealed to the platform 14 (and/or an inner plate 142 of the platform 14, such as with a weld 129 between the inner plate 142 and the bellows 126 at a perimeter of the inner plate 142). The bellows 126 extends between the base 18 and the platform 14, and circumscribes the push-pull screw 38 between the base 18 and the platform 14. The bellows 126 helps maintain the vacuum and temperature within the pressure vessel 22, while allowing the adjustment 30*a* or push-pull screw 38 to be exposed, and to enable adjustment of the relative position of the platform 14 and optical element 26 while in the pressure vessel 22 under vacuum and cryogenic conditions.

The cylindrical bellows 126 can be formed of a rigid material to provide rigidity in a torsional direction, and to resist rotational movement of the platform 14 with respect to the base 18 about a longitudinal axis 130 of the cylindrical bellows. In addition, the bellows 126 can react the torque exerted on the platform 14 (or inner plate 142) when tightening the fastener 66. The longitudinal axis 130 can be substantially coaxial with the axis of the threaded bore 32, the adjuster screw 42, and the fastener 66. In addition, the cylindrical bellows 126 is corrugated along the longitudinal axis 130 to provide flexibility along the longitudinal axis 130, and to allow tilting movement of the platform 14 with respect to the base 18. Thus, the cylindrical bellows 126 is axially flexible to expand and contract in an axial direction, and to tilt the distal end with respect to the proximal end thereof.

The cylindrical bellows 126 has an annular flange 134 coupled to and surrounding the proximal end of the cylindrical bellows 126. The annular flange 134 extends radially outwardly from the cylindrical bellows 126 with respect to the longitudinal axis 130. In one aspect, the annular flange 134 can be formed as part of the bellows 126. The annular flange 134 can be sandwiched between the base 18 and the wall of the pressure vessel 22 to secure the cylindrical bellows 126 to the base 18 and the pressure vessel 22, and to help seal the interface of the base 18 and the wall of the pressure vessel 22. In addition, the bellows 126 has a plate 138 coupled to and extending across the distal end of the cylindrical bellows 126. The plate 138 can close the distal end of the cylindrical bellows 126 (except for apertures to allow for fasteners as described below). In one aspect, the plate 138 can be formed as part of the bellows 126.

The platform 14 can comprise an inner plate 142 disposed inside the cylindrical bellows 126 at the distal end thereof. The inner plate 142 of the platform 14 is coupled to the push-pull screw 38 and the fastener 66. In addition, the inner plate 142 can receive the distal washer 98. In one aspect, the concave indentation 102 of the distal ball-and-socket type joint 106 can be formed in the inner plate 142. The bellows 126 can be sealed to the inner plate 142 of the platform, such as by a weld 129 welding the bellows to the platform. Thus, there is a seal between the bellows 126 and the inner plate 142 of the platform 14. In addition, the platform 14 can comprise an outer plate 146 disposed outside the cylindrical bellows 126 at the distal end of the cylindrical bellows 126. The outer plate 146 of the platform 14 can be coupled to the inner plate 142, such as by fasteners. In one aspect, the outer plate 146 can be removed from the inner plate and the seat between the bellows 126 and the inner plate 142 can be maintained by the weld 129. The outer plate 146 of the platform 14 can carry the optical element 126. Furthermore, the distal end of the cylindrical bellows 126, or plate 138 thereof, can extend between, and be sandwiched between, the inner and outer plates 142 and 146 of the platform 14 to secure the bellows to the platform 14, and to help seal the interface of the cylindrical bellows 126 and the platform 14.

A method of using the mechanism 10 as described above, and for selectively displacing the platform 14 with respect to the base 18, and for locking the platform 14 with respect to the base 18, comprises: 1) turning the adjuster screw 42 of the push-pull screw 38 to displace the platform 14 with respect to (towards or away from) the base 18 by a desired amount; and 2) tightening the fastener 66 of the push-pull screw 38 and carried by the adjuster screw 42 to tighten the platform 14 to the adjuster screw 42 or push-pull screw. Multiple adjustments 30*a* and 30*b* can be used with multiple push-pull screws 38 to tilt the platform 14 with respect to the base 18, with the fastener 66 tilting in the bore 46 of the adjuster screw 42 (and with the fastener 66 tilting about the proximal and distal ball-and-socket type joints 94 and 106), and with the platform tilting about the distal ball-and-socket type joint 106.

As described above, the mechanism 10 can be utilized to secure an optical element 26 to a pressure vessel 22 while allowing precise positioning of the optical element 26. The base 18 is fixed to the pressure vessel 22, and the optical element 26 is coupled to the platform 14. The optical element 26 can be a lens, a mirror, a laser, a light source, an imaging element, or others, or combinations thereof. However, the mechanism 10 does not require an optical element and may instead be used to secure any desired hardware to the pressure vessel 22 while allowing precise positioning of the hardware.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A precision adjustment screw mechanism, comprising:
a base;
a platform carried by the base, the platform being selectively movable towards and away from the base, and selectively tiltable with respect to the base;
a push-pull screw secured to the platform and the base to selectively displace the platform towards and away from the base, the push-pull screw having a ball-and-socket joint between the platform and the base with the platform tiltable with respect to the base about the ball-and-socket joint; and a cylindrical bellows with a proximal end sealed to the base and a distal end coupled to the platform and circumscribing the push-pull screw between the base and the platform, wherein the cylindrical bellows is formed of a rigid material to provide rigidity to resist rotational movement of the platform with respect to the base.

2. The mechanism of claim 1, wherein the cylindrical bellows being formed of the rigid material provides rigidity in a torsional direction and to resist rotational movement of the platform with respect to the base about a longitudinal axis of the cylindrical bellows, and wherein the cylindrical bellows is corrugated along the longitudinal axis to provide flexibility along the longitudinal axis and to allow tilting movement of the platform with respect to the base.

3. The mechanism of claim 1, wherein the cylindrical bellows is axially flexible to expand and contract in an axial direction, and to tilt the distal end with respect to the proximal end thereof.

4. The mechanism of claim 1, further comprising:
an annular flange coupled to and surrounding the proximal end of the cylindrical bellows; and
a plate coupled to and extending across the distal end of the cylindrical bellows.

5. The mechanism of claim 1, wherein the platform further comprises:
an inner plate disposed inside and sealed to the cylindrical bellows at the distal end of the cylindrical bellows and coupled to the push-pull screw; and
an outer plate disposed outside the cylindrical bellows at the distal end of the cylindrical bellows and coupled to the inner plate.

6. The mechanism of claim 5, wherein the distal end of the cylindrical bellows extends between the inner and outer plates.

7. The mechanism of claim 1, wherein the push-pull screw comprises an adjuster screw displaceable in the base, and a fastener extending through a bore in the adjuster screw; and wherein the ball-and-socket joint comprises a proximal ball-and-socket joint between a head of the fastener and a head of the adjuster screw, and a distal ball-and-socket joint between a distal end of the adjuster screw and the platform.

8. The mechanism of claim 7, wherein the distal and proximal ball-and-socket joints comprise convex surfaces at distal and proximal ends of the adjuster screw and a proximal concave indentation associated with the head of the fastener and a distal concave indentation associated with the platform.

9. The mechanism of claim 7, wherein the distal and proximal ball-and-socket joints have a same rotational center.

10. The mechanism of claim 1, wherein the push-pull screw comprises an adjuster screw carried by the base, and a fastener extending through a bore in the adjuster screw to the platform to secure the platform to the adjuster screw and thus the base; and wherein the ball-and-socket joint is disposed between the adjuster screw and the platform with the platform tiltable with respect to the adjuster screw about the ball-and-socket joint and the fastener tiltable within the bore in the adjuster screw.

11. The mechanism of claim 10, wherein the ball-and-socket joint of the push-pull screw comprises a rounded distal end of the adjuster screw abutting a concave indentation carried by the platform.

12. The mechanism of claim 1, wherein the base comprises a threaded bore; and wherein the push-pull screw comprises an adjuster screw with screw threads engaging the threaded bore such that rotating the adjuster screw advances and retracts the adjuster screw in the threaded bore, and thus displaces the platform away from and towards the base, respectively.

13. The mechanism of claim 12, further comprising:
the adjuster screw having a bore therethrough and having a truncated convex end facing the platform and an opposite truncated convex end facing away from the platform;
a proximal washer with a concave indentation receiving and abutting to the opposite truncated convex end of the adjuster screw, and defining a proximal ball-and-socket joint;
a distal washer carried by the platform and having a concave indentation receiving and abutting to the truncated convex end of the adjuster screw, and defining a distal ball-and-socket joint;
a fastener extending through the proximal washer, the bore of the adjuster screw and the distal washer, and coupled to the platform; and
the fastener being rotatable to tighten and loosen the proximal and distal ball-and-socket joints to tighten and loosen pivotal movement of the platform with respect to the base, and the fastener being rotatable to tighten and loosen a plurality of tabs of the adjuster screw with respect to the threaded bore of the base to tighten and loosen rotation of the adjuster screw and thus displacement of the platform with respect to the base.

14. The mechanism of claim 1, wherein:
the base is fixed to a pressure vessel;
the platform is disposed in the pressure vessel; and
the cylindrical bellows is disposed in the pressure vessel.

15. A lockable precision adjustment screw mechanism, comprising:
a base;
a platform carried by the base;
an adjuster screw carried by the base and rotatable to retract and advance with respect to the base to displace the platform towards and away from the base, respectively;
a fastener extending through a bore in the adjuster screw to the platform, the bore of the adjuster screw being wider than the fastener with the fastener tiltable in the bore; and
a cylindrical bellows with a proximal end sealed to the base and a distal end coupled to the platform and circumscribing the adjuster screw and the fastener between the base and the platform.

16. The mechanism of claim 15, further comprising:
a ball-and-socket joint between the platform and the adjuster screw with the platform tiltable with respect to the base about the ball-and-socket joint.

17. An apparatus comprising:
a pressure vessel; and
a lockable precision adjustment screw mechanism comprising:
a base coupled to the pressure vessel;
a platform disposed in the pressure vessel and carried by the base and selectively displaceable towards and away from the base;
a set of at least two adjustments disposed between the base and the platform and spaced-apart from one another, each of the adjustments comprising:
a threaded bore in the base;
a push-pull screw movably disposed in the threaded bore of the base;

the push-pull screw having a ball-and-socket joint between the platform and the base with the platform tiltable with respect to the base about the ball-and-socket joint;

a cylindrical bellows coupled to and between the base and the platform, and circumscribing the push-pull screw between the base and the platform;

a proximal end of the cylindrical bellows being sealed to the base, and a distal end of the cylindrical bellows being coupled to the platform; and the cylindrical bellows being formed of a rigid material to provide rigidity in a torsional direction and to resist rotational movement of the platform with respect to the base about an axial direction of the adjuster screw, and the cylindrical bellows being corrugated along the axial direction to provide flexibility in the axial direction and to allow tilting movement of the platform with respect to the base.

18. The apparatus of claim 17, wherein the pressure vessel is a temperature controlled, cryogenic vacuum chamber capable of maintaining a vacuum and an internal temperature below 123 K; and further comprising an optical element coupled to the platform, the optical element being selected from the group consisting of an FPA, a lens, a mirror, a laser, a light source, an imaging element, or combinations thereof.

19. The apparatus of claim 17, wherein the adjuster screw and the fastener are exposed from the base and are accessible from outside of the pressure vessel.

20. The apparatus of claim 17, wherein the push-pull screw comprises:

an adjuster screw having a bore therethrough and having a truncated convex end facing the platform and an opposite truncated convex end facing away from the platform;

a proximal washer with a concave indentation receiving and abutting to the opposite truncated convex end of the adjuster screw, and defining a proximal ball-and-socket joint;

a distal washer carried by the platform and having a concave indentation receiving and abutting to the truncated convex end of the adjuster screw, and defining a distal ball-and-socket joint;

a fastener extending through the proximal washer, the bore of the adjuster screw and the distal washer, and coupled to the platform;

the adjuster screw being rotatable to advance and retract with respect to the base to displace the platform away from and towards the base, respectively; and the fastener being rotatable to tighten and loosen the proximal and distal ball-and-socket joints to tighten and loosen pivotal movement of the platform with respect to the base, and the fastener being rotatable to tighten and loosen a plurality of tabs of the adjuster screw with respect to the threaded bore of the base to tighten and loosen rotation of the adjuster screw and thus displacement of the platform with respect to the base.

* * * * *